United States Patent
Becker et al.

(10) Patent No.: US 8,375,055 B2
(45) Date of Patent: Feb. 12, 2013

(54) METHOD OF OPERATION FOR A COMPUTER IMPLEMENTING DIFFERENT HANDLING OF PROTECTED AND UNPROTECTED FILES

(75) Inventors: Detlef Becker, Möhrendorf (DE); Karlheinz Dorn, Kalchreuth (DE); Artur Pusztai, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 418 days.

(21) Appl. No.: 12/706,726

(22) Filed: Feb. 17, 2010

(65) Prior Publication Data
US 2010/0211613 A1   Aug. 19, 2010

(30) Foreign Application Priority Data
Feb. 19, 2009   (DE) .......................... 10 2009 009 615

(51) Int. Cl.
*G06F 7/00*   (2006.01)
*G06F 17/30*   (2006.01)
(52) U.S. Cl. ........................................ 707/781; 707/802
(58) Field of Classification Search .................... None
See application file for complete search history.

(56) References Cited

U.S. PATENT DOCUMENTS
| 7,079,649 B1 | 7/2006 | Bramhill et al. |
| 2004/0215970 A1 | 10/2004 | Handa et al. |
| 2007/0028067 A1 * | 2/2007 | Hinrichs et al. ............... 711/164 |
| 2007/0208953 A1 * | 9/2007 | Durand et al. ................. 713/193 |
| 2007/0240096 A1 * | 10/2007 | Pontoppidan et al. ........ 717/101 |
| 2008/0263371 A1 * | 10/2008 | Weissman et al. ............. 713/193 |
| 2010/0218001 A1 * | 8/2010 | Rasizade et al. ............... 713/189 |

FOREIGN PATENT DOCUMENTS
| DE | 69805403 T2 | 12/2002 |
| DE | 102004019679 A1 | 11/2004 |
| DE | 69736697 T2 | 9/2007 |
| EP | 0 853 279 | 7/1998 |

* cited by examiner

*Primary Examiner* — Uyen T. Le
(74) *Attorney, Agent, or Firm* — Harness, Dickey & Pierce, P.L.C.

(57) ABSTRACT

A storage area can be accessed by a computer. Files are stored in the storage area, in which application-related files are stored. Each of the files stored in the storage area is alternatively stored as protected or unprotected file. In at least one embodiment, as a function of commands, which are prespecified by a user to the computer within the scope of running an application, the protected files and/or the unprotected files are read out of the storage area by the computer. Furthermore, in at least one embodiment, as a function of commands which are prespecified by the user to the computer within the scope of running the application, the unprotected files stored in the storage area are changed, deleted and/or converted into protected files and/or new files are determined on the basis of files stored in the storage area and are stored as unprotected files in the storage area. Irrespective of the command prespecified by the user to the computer within the scope of running the application, the computer does not cause the files stored in the storage area to be changed, deleted or converted into unprotected files.

22 Claims, 4 Drawing Sheets

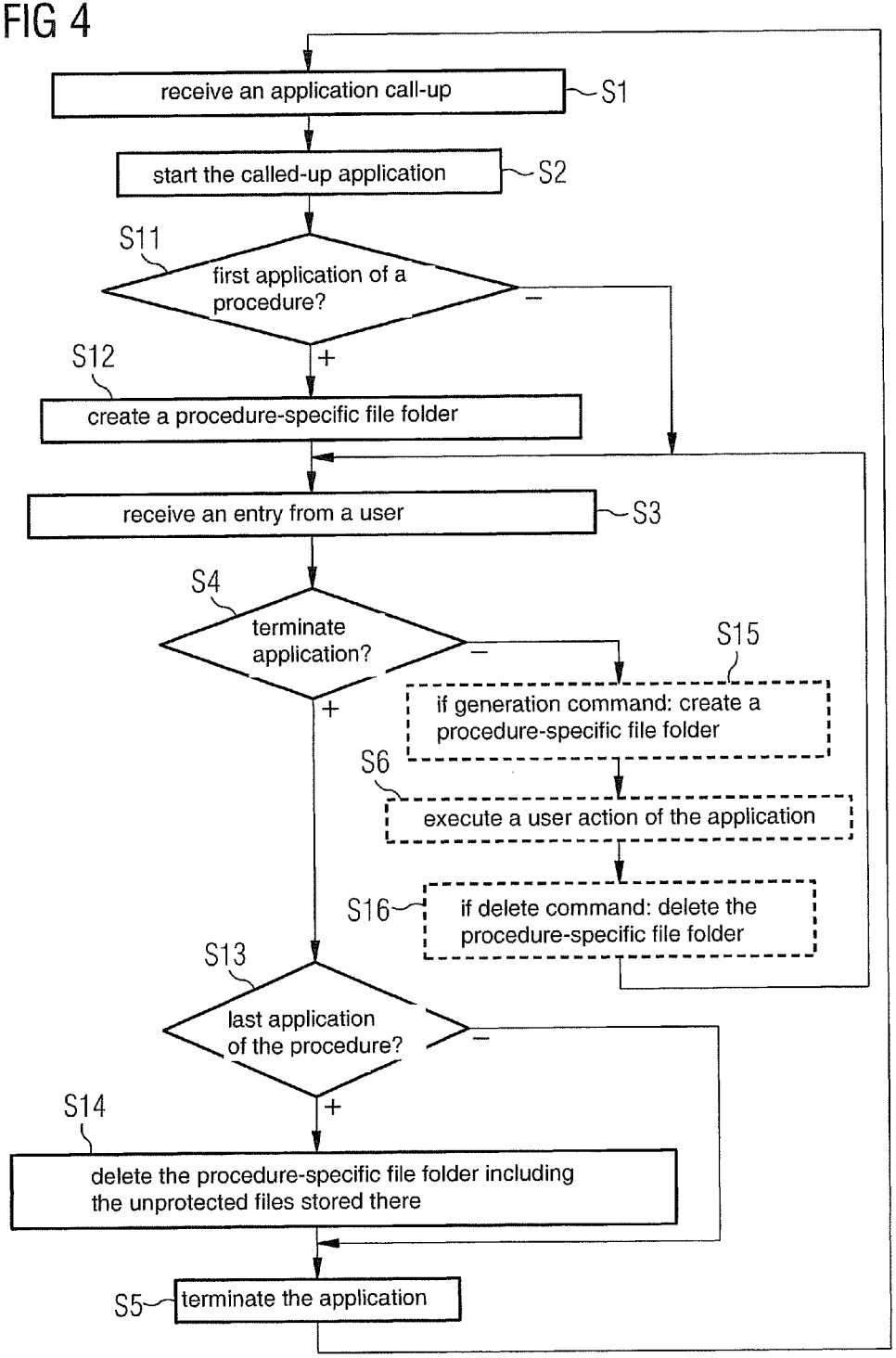

METHOD OF OPERATION FOR A COMPUTER IMPLEMENTING DIFFERENT HANDLING OF PROTECTED AND UNPROTECTED FILES

PRIORITY STATEMENT

The present application hereby claims priority under 35 U.S.C. §119 on German patent application number DE 10 2009 009 615.9 filed Feb. 19, 2009, the entire contents of which are hereby incorporated herein by reference.

FIELD

At least one embodiment of the present invention generally relates to an operating method for a computer. In at least one embodiment it more particularly relates to an operating method for a computer,
  with a storage area being accessible by the computer,
  with files being stored in the storage area, in which files application-related data is stored,
  with it being possible for each of the files stored in the storage area to be stored as protected files,
  with the protected files being read out from the storage area by the computer as a function of commands which are prespecified to the computer by a user within the scope of running an application,
  with new files being determined by the computer and stored in the storage area as a function of commands, which are prespecified to the computer by the user within the scope of running the application and on the basis of files stored in said storage area,
  with the computer not causing the protected files stored in the storage area to be changed or deleted irrespective of the command prespecified to said computer by the user within the scope of running the application.

At least one embodiment of the present invention also generally relates to an application for a computer, which has a machine code which can be immediately processed by the computer and the processing thereof by the computer causes the computer to run an operating method.

BACKGROUND

A computer network is often used within the scope of the data processing of imaging medical-specific systems (post-processing), to which computer network a number of computers (for instance PCs or workstations) is connected, and said computer network having a shared storage area. The shared storage area is generally embodied as a so-called PACS (=picture archiving and communication system). A PACS can however also be used if only one single computer is available, by which the storage area is accessed.

The computers run applications. Within the scope of running the applications, the computers have read access to the shared storage area. Furthermore, within the scope of running the applications, the computers can in this respect often have write access to the shared storage area as they can store new data in the shared storage area. Files which are already stored in the shared storage area can however neither be changed (and/or overwritten) or deleted by the computer within the scope of running the applications. The files stored in the shared storage area are therefore protected files in terms of the applications. With respect to an individual computer, which runs one of the applications, the computer therefore executes the following actions as a function of corresponding commands, which are prespecified thereto by a user:

It reads files out from the storage area and determines new files on the basis of the read out files.

It stores the newly determined files as protected files in the storage area.

By contrast, within the scope of running the application, the computer does not cause the files stored in the storage area to be changed, overwritten or deleted. The prespecification of corresponding commands by the user is not possible and/or the execution of corresponding commands is refused.

In the case of several computers, the computer can actually store the files read out from the storage area and/or the files determined thereby temporarily in a storage facility. Access to this storage facility is however only possible by the respective computer. The other computers in the computer network cannot access this storage facility.

The files which are stored in this storage facility are unprotected files. Said files can not only be read out and written for the first time by the first computer within the scope of running the application but can instead also be changed and deleted.

The deletion of files, which are stored in the storage area, is in principle likewise possible. The deletion nevertheless takes place within the scope of running the applications, in other words the programs processing the data. A separate file management program is used herefor in the prior art. The file management program can even run on one of the computers, which also process the applications. It can alternatively run on another computer, which does not process any of the applications. In any case the file management program is not an application.

It proceeds as follows in the prior art: an application on one of the computers is called up by a user. Within the scope of running the application, new files are determined and stored on the basis of files stored in the storage area. The storage either takes place in the shared storage area or in a storage facility, which can only be accessed by the computer running the respective application.

The newly determined files are subsequently required again by an application, which is run at a subsequent point in time. This can be the same application (if this application was still not completely processed) or another application. If the newly determined files are stored in the storage area, the newly determined files can then also be called up if the calling takes place by another computer, by which the files were stored in the storage area. It is however disadvantageous if, within the scope of the further course, it is determined that the newly determined files were created in a suboptimal fashion. Because it is not only the, still problem-free per se, renewed determination of new files that is necessary, there is instead the problem that previously determined files having been found to be suboptimal not being able to be deleted within the scope of running the application, but instead remaining in the shared storage area. As a result, storage space is occupied, which cannot be used for other purposes. Furthermore, it may be that the files judged to be suboptimal are erroneously called up and further processed at a subsequent point in time. The deletion of the suboptimal files is in principle possible, but laborious, time-consuming and often associated with a large time delay and is furthermore not possible within the scope of running the application.

It is by contrast naturally also possible to store the newly determined files in the storage facility, which is only accessed by the computer running the application. In this case, the changing/overwriting and deletion of the files which are found to be suboptimal is readily possible. This is however disadvantageous in that access to the stored files is only possible by the computer which created the files. Access by another computer in the computer network is not possible.

It is theoretically also conceivable to store the files on a mobile data carrier, for instance a mobile hard disk or a USB memory stick. This procedure is however complicated and relatively slow. Furthermore, in this case access to the files is also linked to the computer, with which the mobile data carrier is connected in each instance.

SUMMARY

At least one embodiment of the present invention creates possibilities which rectify at least one of the disadvantages of the prior art.

In accordance with at least one embodiment of the invention, the files stored in the storage area are alternatively stored as a protected file or as an unprotected file. The files can be read out from the storage area by the computer as a function of commands, which are prespecified to the computer by a user within the scope of running an application. The read-out process is possible irrespective of whether the files are protected or unprotected files. Furthermore, at least one of the subsequent actions is effected by the computer as a function of commands, which are prespecified to the computer by the user within the scope of running the application:

the unprotected files stored in the storage area are changed,
the unprotected files stored in the storage area are deleted,
the unprotected files stored in the storage area are converted into protected files,
new files are determined on the basis of files stored in the storage area and are stored in the storage area as unprotected files.

Irrespective of the command which is predetermined to the computer by the user within the scope of running the application, the computer does not however cause the protected files stored in the storage area to be changed, deleted or converted into unprotected files.

It is in principle possible to record the files individually in order to determine whether they are protected files or unprotected files. It is however generally considerably simpler to combine the unprotected files in a single file folder. The file folder can comprise subfolders.

In most cases the application forms part of a procedure, which includes at least one further application. In this case, it is advantageous if a procedure-specific file folder is assigned to the procedure in the storage area and at least the unprotected files, which are accessed within the scope of the procedure, are stored in the procedure-specific file folder.

In an example embodiment of the present invention, provision is made for the application to create the procedure-specific file folder in the event that it is the application of the procedure which is run first. For instance, as a result of the functionality of the application, it is possible to know in advance that it is the application of the procedure which is run first. Alternatively, the procedure-specific file folder can be automatically created for instance if the application implements an access to a protected file, which is not managed by way of a procedure-specific file folder. It is in turn alternatively possible for the application to create a procedure-specific file folder if a corresponding command, if necessary plus a file name, is specified thereto by the user of the application. It is also possible for the application to be notified by the user as to whether or not it is the application of the procedure which is run first.

Copies of protected files are also preferably stored in the procedure-specific file folder, said protected files having already been stored in the storage area at the start of the procedure. In this case, it is not a problem if the protected files are deleted as such (for instance by way of a corresponding system routine). Because in this case the local copies in the procedure-specific file folder are also available.

Alternatively it is possible for references to protected files to be managed by means of the procedure-specific file folder, the references already being present at the start of the procedure. In this case, a potentially time-consuming copying process can be omitted depending on the extent of the files to be copied.

In the event that the management of the protected files takes place by way of references, the already existing protected files are preferably identified in the storage area as having been used by the procedure. Delete protection can be achieved as a result.

The procedure-specific file folder (including its content) is deleted if the procedure is terminated. Different possibilities exist herefor.

It is on the one hand possible when terminating the application for the application to automatically delete the procedure-specific file folder including the unprotected files stored in the procedure-specific file folder in the event that it is the application of the procedure which is run last. The instance that the application is the application of the procedure which is run last can be known in advance for instance on the basis of the functionality of the application. Alternatively, a corresponding entry by the user can take place.

It is alternatively possible for the application to delete the procedure-specific file folder including the unprotected files stored in the procedure-specific file folder if a corresponding delete command is prespecified thereto by the user.

Depending on the type of management of the protected files, which were already stored in the storage area at the start of the procedure, the copies of the already existing protected files are alternatively likewise deleted when deleting the procedure-specific file folder or the references to the protected files and the identifier of the already existing protected files are deleted as having been used by the procedure.

It is possible to store protected files, which are created within the scope of an application of the procedure, initially only in the procedure-specific file folder. In this case, prior to deleting the procedure-specific file folder, the application transfers unprotected files, which are converted into protected files within the scope of the procedure, into a part of the storage area which is not managed by the procedure-specific file folder.

It is possible for the transfer into the part of the storage area which is not managed by the procedure-specific file folder to take place immediately before deleting the procedure-specific file folder. It is alternatively possible for the transfer into the part of the storage area which is not managed by the procedure-specific file folder to take place immediately after conversion into protected files or on the basis of a prespecification of a corresponding transfer command. In the two cases mentioned last, the files transferred into the part of the storage area which is not managed by the procedure-specific file folder are treated like protected files after transfer into the part of the storage area which is not managed by the procedure-specific file folder, said protected files already having existed at the start of the procedure.

At least one embodiment is also directed to an application for a computer comprising the machine code, which can be processed immediately by the computer and the processing of which by the computer causes the computer to perform at least one embodiment of an inventive operating method. The application can be stored on a data carrier in machine-readable form.

BRIEF DESCRIPTION OF THE DRAWINGS

Further advantages and details result from the subsequent description of example embodiments in conjunction with the drawings, in which:

FIGS. 2 to 4 show schematic diagrams of flow charts.

DETAILED DESCRIPTION OF THE EXAMPLE EMBODIMENTS

Figure 1:
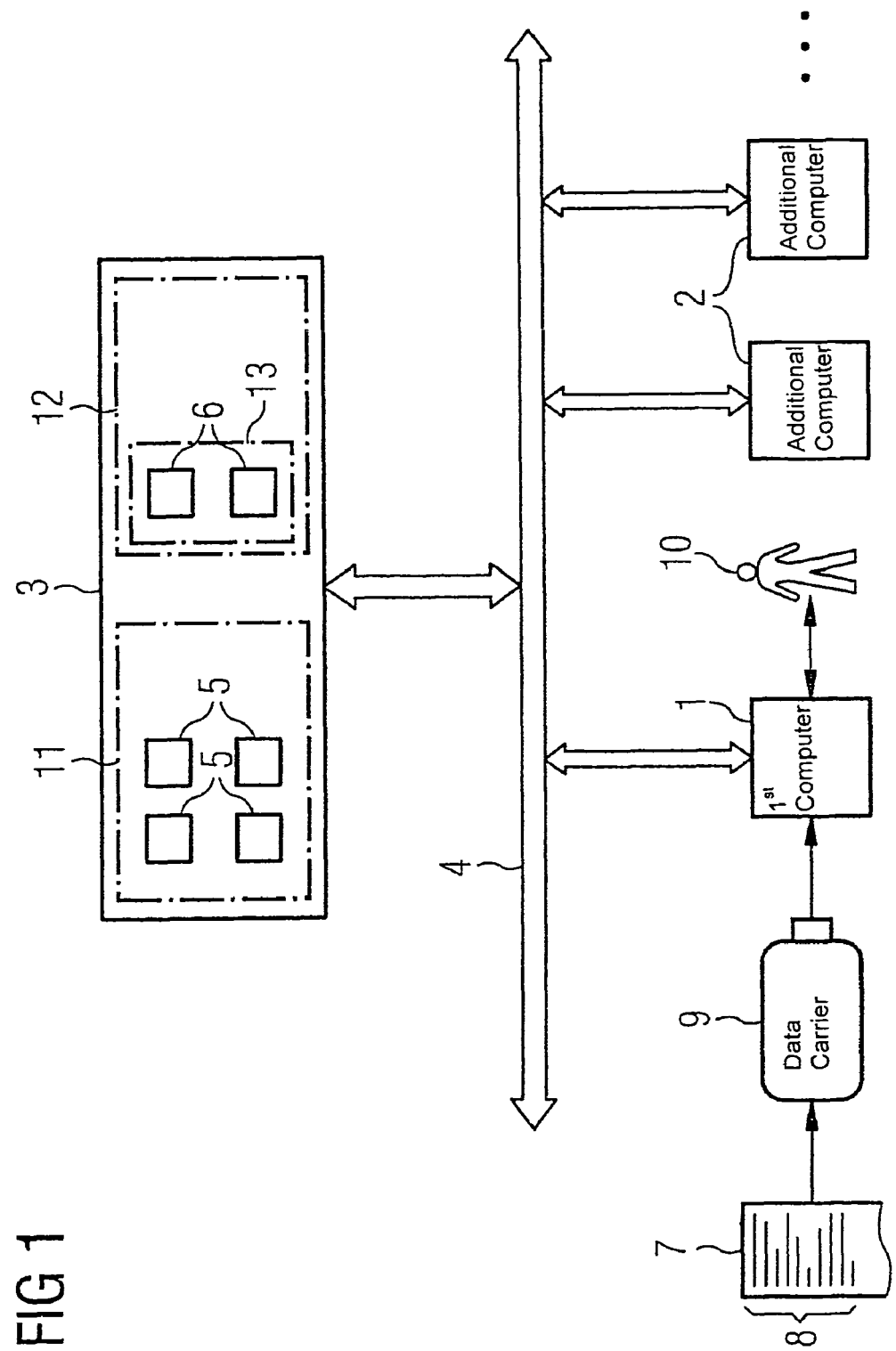
FIG. 1 shows a schematic diagram of a block diagram of a computer network.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

According to the example embodiment in FIG. 1, a computer network comprises a first computer 1, at least one additional computer 2 and a shared storage area 3. The computer 1, 2 and the shared storage area 3 are connected to one another by way of a data link 4. Each computer 1, 2 can access the shared storage area 3, namely generally both with read and also write access. However according to FIG. 1 the shared storage area 3 is neither an integral part of the first computer 1 nor an integral part of one of the additional computers 2. For instance, the shared storage area 3 can be a integral part of a server not shown in more detail in FIG. 1. This is however less important. It is decisive that access to the shared storage area 3 by each of the computers 1, 2 is possible irrespective of the other computers 1, 2, i.e. access by the respective computer 1, 2 is possible if the respective computer 1, 2 is connected to the data link 4. Whether or not the respective other computer 2, 1 is connected to the data link 4 is irrelevant.

The shared storage area 3 is embodied in the manner of a remanent memory. It also retains its data content if it is not actively supplied with energy. For instance, the shared storage area can be embodied as one or more hard disks. Files 5, 6 are stored in the shared storage area. The files 5, 6 are application-related files such as image files, which were acquired by way of imaging medical-specific facilities or are files derived from images of this type.

Each computer 1, 2 generally also has a local memory (hard disk or suchlike), which is only accessed by the respective computer 1, 2. The local memories are not shown in FIG. 1, since they are less important within the scope of an embodiment of the present invention.

The above-described embodiment is conventional but not obligatory. It is possible for instance to dispense with the additional computer 2. In this case, the shared storage area 3 is no longer a "shared" storage area since it is only accessed by the first computer 1. The shared storage area 3 can also be an integral part of the first computer 1. This applies irrespective of whether additional computers 2 are present. If the storage area 3 is a integral part of the first computer 1 and additional computers 2 are not present, the data link 4 can also be omitted.

The computers 1, 2 are generally equivalent to one another. Closer reference is therefore subsequently only made to the first computer 1. The statements made below in respect of the first computer 1 can however also be applied to the additional computer 2, provided they are available.

In accordance with FIG. 1, an application 7 can be called up by the first computer 1. The application 7 includes a machine code 8, which can be immediately processed by the first computer 1. The processing of the application 7 by the first computer 1 means that the first computer 1 executes an operating method which is explained in more detail below.

At the time of the calling, the application 7 is generally stored in the local memory of the first computer 1 in machine-readable form (e.g. optically, electronically or magnetically). The application 7 may have previously been supplied to the first computer by way of a USB memory stick 9 or another mobile data carrier such as a CD-ROM or a SD storage card for instance. It is also possible to supply the application 7 to the first computer 1 by way of a computer-computer link, for instance the internet or the data link 4 shown.

Prior to calling up the application 7, the first computer 1 initially operates in its operating system. Within the scope of running the operating system, the first computer 1 according to FIG. 2 receives an application 7 call in step S1. In response to the application 7 call, the first computer 1 starts the called-up application 7 in a step S2.

The step S1 is, as mentioned, processed within the scope of running the operating system. By contrast, step S2 and also subsequent steps S3 to S6 are executed by the first computer 1 within the scope of running the called-up application 7.

In step S3, the first computer 1 receives an entry from a user 10. In step S4, the first computer 1 checks whether the entry by the user 10 is a command to terminate the application 7. If this is the case, the first computer 1 terminates the application 7 in a step S5 and goes back to step S1. On the other hand, the first computer 1 executes a user action of the application 7 in a step S6.

Not every program, which can be run by the first computer 1, is an application within the meaning of embodiments of the present invention. A program is then an application if it cumulatively fulfils the subsequent criteria:
it receives entries from the user 10,
it accesses files 5, 6 as a function of the entries of the user 10, said files being stored in the shared storage area 3,
it outputs (for instance by way of a display unit (not shown)) images to the user 10, said images being determined on the basis of the read-out files 5, 6.

The application 7 is therefore an application because it can process and display the files 5, 6 stored in the shared storage area 3 to form images and because the user 10 of the application 7 can prespecify which of the files 5, 6 are to be displayed. Pure management programs for the files 5, 6, by means of which the files can be copied, shifted within the shared storage area 3 or beyond, renamed and deleted, but the contents of the files 5, 6 cannot however be evaluated, are not applications within the meaning of embodiments of the present invention.

The afore-described functionality of the application 7 represents a minimal functionality. It is additionally possible for the first computer 1, within the scope of running the application 7 on the basis of files 5, 6, which are stored in the shared storage area 3, to determine and store new files. The storage can take place in particular in the shared storage area 3. Examples of functionalities of this type are the segmentation of bones or blood vessels into two or three-dimensional images or the determination of a three-dimensional image from a number of two-dimensional projection images. A further possible functionality is the determination of functional parameters such as perfusion and suchlike from a temporal sequence of files 5, 6.

As described previously, the embodiment of the computer network and the operation of the first computer 1 is conventional in the prior art. As described previously, these procedures are also applied to embodiments of the present invention. The inventive embodiments of the shared storage area 3 and the operating mode of the first computer 1 are described in more detail below.

A read access of the first computer 1 to the shared storage area 3 is possible in the prior art within the scope of running the application 7. This access is needed so that the first computer 1 can store newly determined files in the shared storage area 3. The files 5, 6 stored in the shared storage area 3 are however without exception protected files in the prior art. Within the scope of running an application of the prior art, they cannot be overwritten by the first computer 1 or changed or deleted after calling. Each file 5, 6, which is stored in the shared storage area 3 by an application, is, in the prior art, stored in addition to the files 5, 6 which are already stored in the shared storage area 3.

Contrary hereto, a distinction is made in embodiments of the present invention between protected files 5 and unprotected files 6. The protected files 5 can only be read by the first computer 1 within the scope of running the inventive application 7, just like in an application of the prior art, but cannot be changed, overwritten or deleted. For the sake of good order, reference is made here to the fact that the terms "changed" and "overwritten" are used synonymously. With the unprotected files 6, any access can by contrast be possible. Furthermore, it may be possible for the first computer 1, within the scope of running embodiments of the inventive application 7, to convert unprotected files 6 into protected files 5. After conversion into protected files 5, only read access to the corresponding files 5 is however still possible. A back conversion into unprotected files 6 is no longer possible.

Figure 3:
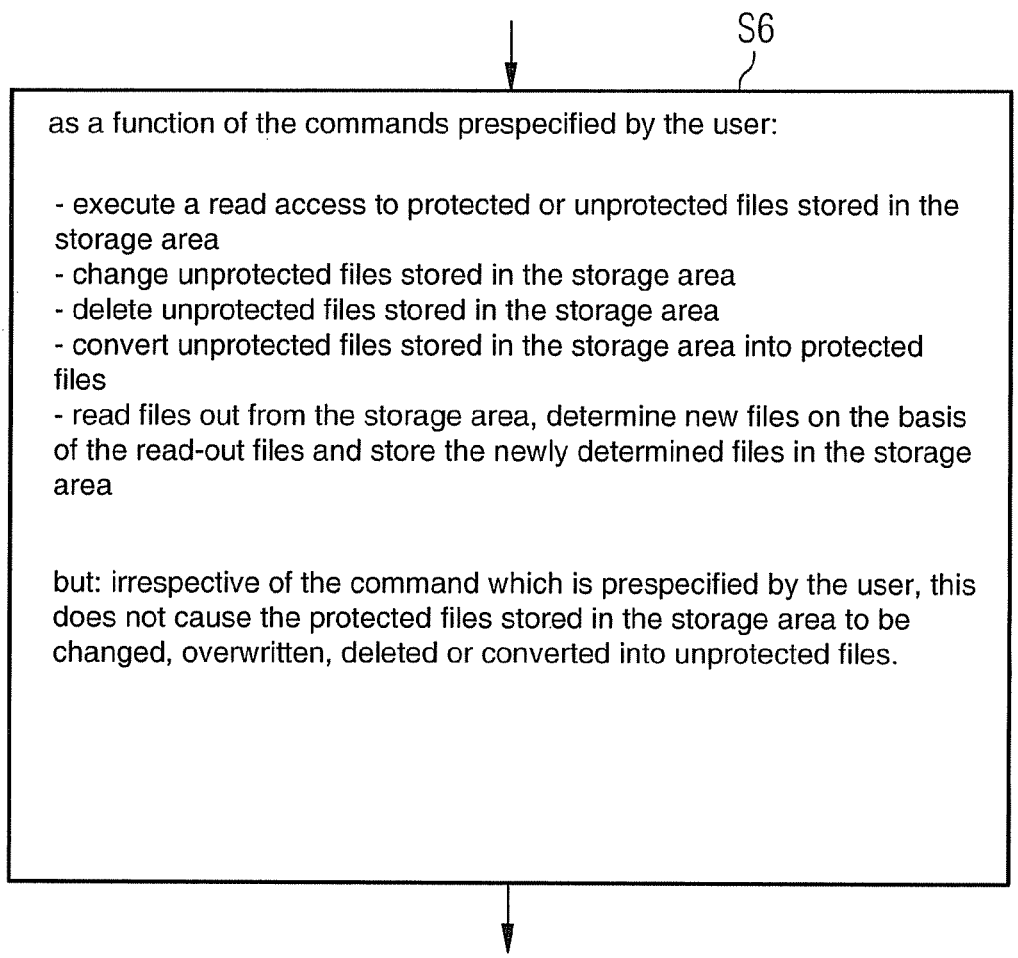

In accordance with FIG. 3, within the scope of performing the user action of embodiments of the inventive application 7, the first computer 1 is able to execute a read access to files 5, 6 stored in the shared storage area 3 as a function of the commands prespecified thereto by the user 10. The first computer reads the corresponding files 5, 6 out from the shared storage area 3. The read access is possible both with protected files 5 and also with unprotected files 6.

Furthermore, within the scope of executing the user action of embodiments of the inventive application 7, the first computer 1 is able to implement at least one of the subsequent actions as a function of the commands prespecified thereto by the user 10:
It changes the unprotected files 6 stored in the shared storage area 3. For instance, the first computer 1 can call up, process and change one of the unprotected files 6 within the scope of the processing and store the changed version under the previous file name. Similarly, the first computer 1 can in principle arbitrarily store a file under the name of the already existing unprotected file 6. For instance, the first computer 7 can create a new file and store it under the name of an existing different unprotected file 6 or can copy a protected or unprotected file 5, 6 and store it under the name of the existing unprotected file 6.
The first computer 1 can delete the unprotected files 6 stored in the shared storage area 3.

The first computer 1 can convert the unprotected files 6 stored in the shared storage area 3 into protected files 5. The unprotected file 6 is not changed in terms of content during this process. It is only its status that changes from unprotected to protected.

The first computer 1 can read files 5, 6 out from the shared storage area 3, determine new files on the basis of the read-out files 5, 6 and store them in the shared storage area 3. Storage as an unprotected file 6 is at least possible here. Alternatively, the user 10 can prespecify to the first computer 1 whether it stores the newly determined files as protected files 5 or as unprotected files 6.

Irrespective of the command which is prespecified to the first computer 1 by the user 10 within the scope of running embodiments of the inventive application 7, the first computer 1 does not however cause the protected files 5 stored in the shared storage area 3 to be changed and/or overwritten, deleted or converted into unprotected files 6.

Different procedures can be used in order to be able to make a distinction between protected files 5 and unprotected files 6 within the shared storage area 3. It is possible for instance to correspondingly mark the files 5, 6 separately and individually. A flag can be assigned to each file name for instance, said flag specifying according to its status whether the respective file 5, 6 is a protected file 5 or an unprotected file 6. It is however considerably more elegant for the shared storage area 3 according to the representation in FIG. 1 to have several, that is at least two—sub regions 11, 12, which are subsequently referred to as first sub region 11 and second sub region 12 for linguistic distinction purposes. The files 5, which are stored in the first sub region 11, are in this case protected files 5 on the basis of their storage in the first sub region 11. The files 6 which are stored in the second sub region 12 are in this case unprotected files 6 on the basis of their storage in the second sub region 12. The first sub region 11 is a protected sub region, the contents of which can be read and initially written by the first computer 1 when running the application, but cannot be overwritten, changed and deleted. The second sub region 12 is by contrast an unprotected sub region, which can be accessed by the first computer 1 and, within the scope of running the inventive application 7, in principle in any fashion. In terms of the application 7, the sub regions 11, 12 can be treated like network drives of the computer network for instance.

For reasons of clarity, it is advantageous within the scope of data management if a file folder 13 is created in which at least the unprotected files 6 are stored, which are accessed within the scope of the inventive application 7. If the shared storage area 3 is subdivided into a (protected) first sub region 11 and an (unprotected) second sub region 12, the file folder 13 is naturally an integral part of the second sub region 12.

In many cases, the application 7 run by the first computer 1 is an integral part of a procedure, which includes at least one further application. For instance, a three-dimensional volume reconstruction (=image file within the meaning of the present invention) of the examination object can be performed by way of a first application with the aid of x-ray images (=image files within the meaning of the present invention) of an examination object. A segmentation for instance of the blood vessel system of the examination object can be performed by means of a second application and thus a further image file can be created within the meaning of the present invention. A visualization of the blood vessel system takes place by means of a third application.

In such a case, in other words when the application 7 is an integral part of a procedure, which comprises at least one further application, the afore-cited file folder 13 is preferably not assigned to the application 7 and thus application-specific, but is instead assigned to the procedure and is thus procedure-specific. In the procedure-specific file folder 13, at least the unprotected files 6 are stored, which are accessed within the scope of the procedure (in other words within the scope of running one of the applications 7 of the procedure).

Figure 2:
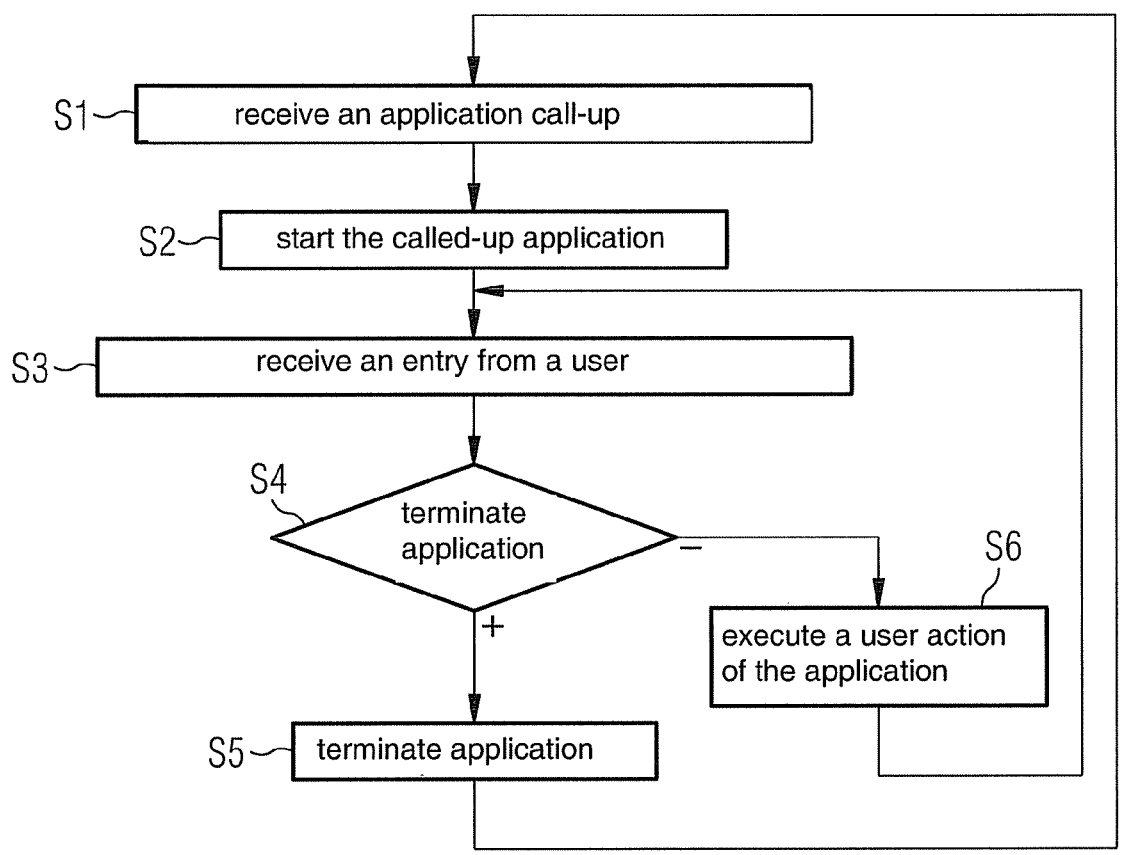

In particular in a case of this type in which a procedure-specific file folder 13 is used, the procedure in FIG. 2 is modified according to FIG. 4. The procedure in FIG. 4 contains, based on steps S1 to S6 in FIG. 2, additional steps S11 to S14. The steps S11 to S14 are run by the first computer 1 within the scope of running an embodiment of the inventive application 7.

In step S11, the first computer 1 checks whether the application 7 run thereby is the application 7 of the procedure which is run first. If this is the case, the computer 1 creates the procedure-specific file folder 13 in step S12 within the scope of running the application 7.

It is possible that as a result of the functionality of the application 7 run it is previously known that the application which is run is the application 7 of the procedure which is run first. Alternatively, it is possible for instance for the application 7 to be informed by the user 10 by entering a corresponding item of information as to whether or not the application 7 of the procedure is the first to be run. It is also possible for the application 7 to explicitly prespecify a corresponding generation command for creating the procedure-specific file folder 13. This optional configuration is indicated in FIG. 4 with step S15 represented in dashed form.

Similarly in step S13, the first computer 1 analyses whether the application 7 is the application 7 of the procedure which is run last. If this is the case, the computer 1, within the scope of terminating the application 7 in step S14, automatically deletes the procedure-specific file folder 13. It naturally not only deletes the procedure-specific file folder 13 as such, but instead also the unprotected files 6 stored in the procedure-specific file folder 13.

It is possible that on the basis of the functionality of the application 7, it is already known that the application is the application 7 of the procedure which is run last. Alternatively, it is possible to prespecify a corresponding item of information to the application 7 which is run.

Alternatively to an automatic deletion of the procedure-specific file folder 13 when terminating the application 7 of the procedure which is run last, it is possible for the application to delete the procedure-specific file folder 13 (naturally also including the unprotected files 6 stored in the file folder 13) if a corresponding delete command is specified thereto by the user 10. This is indicated in FIG. 4 with an optional, step S16 represented in dashed form.

As already mentioned, at least the unprotected files 6 are stored in the procedure-specific file folder 13, said files 6 being accessed within the scope of the procedure. The protected files 5 are preferably managed by way of the procedure-specific file folder 13, the protected files already being stored in the shared storage area 3 at the start of the procedure and being required within the scope of the procedure. As a whole, these protected files 5 are indentified below as an initial inventory.

The management of the initial inventory can take place in different ways. Copies of the protected files 5 of the initial inventory can be stored in the procedure-specific file folder 13 for instance. The copies are in this case, contrary to the protected files 5 of the initial inventory itself, unprotected files 6, which can in principle be deleted, changed and overwritten at any time and deleted at the latest when deleting the procedure-specific file folder 13.

It is alternatively possible for the references (for instance pointers) to the protected files 5 of the initial inventory to be managed by way of the procedure-specific file folder 13. In this case, the references (contrary to the protected files 5 of the initial inventory itself) are treated as unprotected files 6.

As mentioned above, it is in principle possible to change and delete protected files 5, for instance by way of a corresponding memory management program for the shared storage area 3. The memory management program is in this case not an application, but instead a pure management program. To prevent protected files 5 of the initial inventory, which are not managed by means of copies but instead by way of references, from being deleted, provision is preferably made for the protected files 5 of the initial inventory to be identified in the shared storage area 3 as having been used by the procedure.

When deleting the procedure-specific file folder 13, the references to the protected files 5 of the initial inventory are likewise deleted. Furthermore, if available, the identifier of the protected files 5 of the initial inventory is also deleted as having been used by the procedure.

To identify the protected files 5 as having been used by the procedure, a flag can be used. It is also possible to assign a reference to the corresponding procedure-specific file folder 13 to the protected files 5. It is however simplest to assign a counter to each protected file 5, said counter containing the number of procedure-specific file folders 13, which manage the respectively protected file 5. It is then only necessary for the counter of the correspondingly protected file 5 to be incremented by one when storing the reference to the respective protected file 5 in a procedure-specific file folder 13. When deleting the reference, the corresponding counter is decremented by one. A counter status which differs from zero, means in this case that the respectively protected file 5 is managed by at least one procedure-specific file folder 13. Only one counter status of zero means that the respectively protected file 5 is not managed by any individual procedure-specific file folder 13.

As already mentioned, it is possible to store newly determined files as unprotected files 6. The storage takes place in this case in the procedure-specific file folder 13. It is however similarly possible to convert unprotected files 6 into protected files 5. These files have to be retained when deleting the procedure-specific file folder 13. It is therefore necessary for the application 7 to transfer unprotected files 6, which are converted within the scope of the procedure into protected files 5, into a part of the shared storage area 3, for instance the first sub, which is not managed by the procedure-specific file folder 13, prior to deleting the procedure-specific file folder, and therefore to be retained when deleting the procedure-specific file folder 13. Different realizations are possible herefor.

It is on the one hand possible for the transfer into the part 11 of the shared storage area 3 which is not managed by the procedure-specific file folder 13 to take place immediately before deleting the procedure-specific file folder 13. It is alternatively possible to perform the transfer into the part 11 of the shared storage area 3, which is not managed by the procedure-specific file folder 13, immediately after conversion into protected files 5 or on the basis of an (explicit) prespecification of a corresponding transfer command by the user 10. In this case, the files 5 transferred into the part 11 of the shared storage area 3 which is not managed by the procedure-specific file folder 13 are treated like protected files 5 of the initial inventory following the transfer.

The procedure-specific file folder 13 is, as apparent from the afore-cited embodiments, an unprotected file folder. It can be deleted. It is possible for the procedure-specific file folder 13 to be a completely unprotected file folder. In this case it can be deleted by any application, irrespective of whether or not this application is an integral part of the corresponding procedure. It is alternatively possible to provide protective mechanisms, so that only the applications 7 of the procedure are able to delete the procedure-specific file folder 13 (and its content). For instance, a corresponding password protection can be provided. It is alternatively possible to likewise manage the procedure as such. For instance, the application 7 which is run first generates a management unit for the procedure and transfers an identification for the procedure-specific file folder 13 for to this management unit. The other applications 7 of the procedure (including the application 7 which is run last) register with the management unit and receive the identification for the procedure-specific file folder 13. The application which is run last does not only delete the procedure-specific file folder 13, but also the management unit.

In the shared storage area 3, it is not only the files 5, 6 which are generally stored as such but also database-like index data, on the basis of which the files 5, 6 can be quickly found. The index data can be managed within the scope of the present invention in a similar way to the files 5, 6 themselves. In particular, the index data can similarly be copied into the procedure-specific file folder 13 or managed by reference. The manner of managing the index data and the manner of managing the files 5, 6 may be the same or may differ. It is in particular possible,

- to copy both the protected files 5 of the initial inventory and also the corresponding index data into the procedure-specific file folder 13,
- to manage both the protected files 5 of the initial inventory as well as the corresponding index data by reference or
- to manage the protected files 5 of the initial inventory by reference, but to copy the corresponding index data.

Embodiments of the present invention have many advantages. In particular, a user-friendly generation, using a correction possibility of new files 5, 6, is possible without having to load the shared storage area 3 with "dead" ballast.

The above description is used exclusively to explain the present invention. The scope of protection of the present invention is on the other hand to be exclusively determined by the appended claims.

The patent claims filed with the application are formulation proposals without prejudice for obtaining more extensive patent protection. The applicant reserves the right to claim even further combinations of features previously disclosed only in the description and/or drawings.

The example embodiment or each, example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCE CHARACTERS 1 first computer
2 additional computer
3 storage area
4 data link
5 protected files
6 unprotected files
7 application
8 machine code
9 data carrier
10 user
11 first sub area
12 second sub area
13 file folder
S1 to S16 steps

What is claimed is:

1. An operating method for a computer, comprising:
having a storage area which is accessible by the computer;
storing files in the storage area, the files including application-related data stored therein;
storing protected and unprotected files in the storage area;
reading out the protected files and the unprotected files, from the storage area by the computer, as a function of commands specified to the computer by a user within the scope of running an application; and
manipulating the unprotected files by the computer as a function of commands specified to the computer by the user within the scope of running the application, the manipulating including at least one of:
changing the unprotected files stored in the storage area,
deleting the unprotected files stored in the storage area,
converting the unprotected files, stored in the storage area, into protected files, and
determining new files on the basis of files stored in the storage area and storing the determined new files as unprotected files in the storage area, wherein
the protected files stored in the storage area are not changed, deleted or converted into unprotected files by the computer irrespective of the command which the user specifies to the computer within the scope of running the application.

2. The operating method as claimed in claim 1, wherein the application forms an integral part of a procedure, which includes at least one further application such that a procedure-specific file folder is assigned to the procedure in the storage area and wherein at least the unprotected files, which are accessed within the scope of the procedure, are stored in the procedure-specific file folder.

3. The operating method as claimed in claim 2, wherein, in the event that the application is the application of the procedure which is run first, the application creates the procedure-specific file folder.

4. The operating method as claimed in claim 3, wherein the application is informed by the user as to whether or not it is the application of the procedure which is run first.

5. The operating method as claimed in claim 4, wherein copies of protected files are stored in the procedure-specific file folder, said files being already stored in the storage area at a start of the procedure.

6. The operating method as claimed in claim 4, wherein references to protected files are managed by way of procedure-specific file folder, said protected files already existing at the start of the procedure.

7. The operating method as claimed in claim 3, wherein copies of protected files are stored in the procedure-specific file folder, said files being already stored in the storage area at a start of the procedure.

8. The operating method as claimed in claim 3, wherein references to protected files are managed by way of procedure-specific file folder, said protected files already existing at the start of the procedure.

9. The operating method as claimed in claim 2, wherein copies of protected files are stored in the procedure-specific file folder, said files being already stored in the storage area at a start of the procedure.

10. The operating method as claimed in claim 9, wherein the application, in the event that it is the application of the procedure which is run last, automatically deletes the procedure-specific file folder including the unprotected file stored in the procedure-specific file folder when terminating the application.

11. The operating method as claimed in claim 10, wherein, when deleting the procedure-specific file folder, the copies of the already existing protected files are likewise deleted.

12. The operating method as claimed in claim 10, wherein the application transfers unprotected files, which are converted into protected files within the scope of the procedure, prior to deleting the procedure-specific file folder into a part of the storage area which is not managed by the procedure-specific file folder.

13. The operating method as claimed in claim 12, wherein the transfer into the part of the storage area which is unmanaged by the procedure-specific file folder takes place immediately before deleting the procedure-specific file folder.

14. The operating method as claimed in claim 12, wherein the transfer into the part of the storage area which is not managed by the procedure-specific file folder takes place immediately after conversion into protected files or on the basis of a prespecification of a corresponding transfer command and that the files transferred into the part of the storage area which is not managed by the procedure-specific file folder are treated like protected files which were already present at the start of the procedure, following the transfer into the part of the storage area which is not managed by the procedure-specific file folder.

15. The operating method as claimed in claim 2, wherein references to protected files are managed by way of procedure-specific file folder, said protected files already existing at the start of the procedure.

16. The operating method as claimed in claim 15, wherein the already existing protected files in the storage area are identified as having been used by the procedure.

17. The operating method as claimed in claim 16, wherein the application deletes the procedure-specific file folder including the unprotected files stored in the procedure-specific file folder, if a corresponding delete command is specified thereto by the user.

18. The operating method as claimed in claim 17, wherein, when deleting the procedure-specific file folder, references to the already existing protected files and the identifier of the already existing protected files are deleted as having been used by the procedure.

19. The operating method as claimed in claim 2, wherein the application, in the event that it is the application of the procedure which is run last, automatically deletes the procedure-specific file folder including the unprotected file stored in the procedure-specific file folder when terminating the application.

20. The operating method as claimed in claim 2, wherein the application deletes the procedure-specific file folder including the unprotected files stored in the procedure-specific file folder, if a corresponding delete command is specified thereto by the user.

21. A non-transitory computer readable medium including program segments for, when executed on a computer device, causing the computer device to implement the method of claim 1.

22. The non-transitory computer readable medium as claimed in claim 21, wherein the program segments are stored on a mobile hardware data carrier.

* * * * *